United States Patent
Ferenczi

(10) Patent No.: US 12,229,761 B1
(45) Date of Patent: Feb. 18, 2025

(54) NON-FUNGIBLE TOKENS FOR PAYMENT INSTRUMENTS

(71) Applicant: American Express Travel Related Services Company, Inc., New York, NY (US)

(72) Inventor: Andras L. Ferenczi, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 81 days.

(21) Appl. No.: 17/472,161

(22) Filed: Sep. 10, 2021

(51) Int. Cl.
    G06Q 20/38 (2012.01)
(52) U.S. Cl.
    CPC .............................. G06Q 20/3829 (2013.01)
(58) Field of Classification Search
    None
    See application file for complete search history.

(56) References Cited

U.S. PATENT DOCUMENTS

| | | | | |
|---|---|---|---|---|
| 2010/0017278 A1* | 1/2010 | Wilen | ............... | G06Q 40/02 705/26.1 |
| 2010/0299194 A1* | 11/2010 | Snyder | ............... | G06Q 30/0211 705/14.23 |
| 2015/0356649 A1* | 12/2015 | Glass | ............... | H04L 65/403 705/26.1 |
| 2017/0200147 A1* | 7/2017 | Ansari | ............... | G06Q 20/381 |
| 2018/0012206 A1* | 1/2018 | Sood | ............... | G07F 7/025 |
| 2019/0130387 A1* | 5/2019 | Arora | ............... | G06Q 30/0207 |
| 2021/0279695 A1* | 9/2021 | Rice | ............... | G06F 3/0488 |
| 2022/0198447 A1* | 6/2022 | Haruna | ............... | G06Q 50/10 |

OTHER PUBLICATIONS

Pomerantz, Vyper ERC-721 Contract Walkthrough, 2021, https://ethereum.org/en/developers/tutorials/erc-721-vyper-annotated-code/#mint-burn (Year: 2021).*

* cited by examiner

Primary Examiner — Courtney P Jones
Assistant Examiner — Christine Dang
(74) Attorney, Agent, or Firm — Thomas | Horstemeyer, LLP

(57) ABSTRACT

Disclosed are various embodiments for providing non-fungible tokens (NFT) as a mechanism for verifying ownership of payment instruments such as stored value payment instruments. First, a computing device can receive a purchase notification, the purchase notification indicating that a first user has purchased a stored value payment instrument. Then, the computing device can create a non-fungible token (NFT) on a distributed data store in response to receipt of the purchase notification. Next, the computing device can associate a unique identifier of the NFT with the stored value payment instrument. Subsequently, the computing device can receive a first public key associated with the first user. Then, the computing device can update an owner identifier of the NFT with the first public key associated with the first user.

19 Claims, 6 Drawing Sheets

US 12,229,761 B1

NON-FUNGIBLE TOKENS FOR PAYMENT INSTRUMENTS

BACKGROUND

Ownership of a payment instrument is often tied directly to the payment instrument itself. For example, the owner of a credit or debit card account is often included in the information of the account itself. However, some payment instruments are not directly associated with particular individuals. For example, gift cards, prepaid debit cards, and other stored value payment instrument often are unassociated with any particular individual so that they can be transferred easily between individuals (e.g., as gifts). As a result, it can be difficult to determine whether someone is the authorized owner or user of a given stored value payment instrument.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using non-fungible tokens (NFTs) to identify and verify the owner or authorized user of a bearer instrument, such as a stored value payment instrument. An NFT can be created when a stored value payment instrument is created and/or issued to a first user. The NFT can be directly associated with the stored value payment instrument and with the first user. Transferring ownership of the NFT from the first user to a second user can therefore act as a transfer of ownership of the associated stored value payment instrument. When a request is received to activate, redeem, or otherwise access or use the stored value payment instrument, the information in the request can be compared to the information stored in the NFT to determine if the request is made by the actual owner of the NFT and, therefore, the actual owner of the stored value payment instrument.

As a result, the various embodiments of the present disclosure provide for improvements to payment processing systems by implementing additional features that were not previously available. These features include being able to determine whether a request to activate, redeem, or otherwise access or use the stored value payment instrument comes from the current owner of the stored value payment instrument or from an unauthorized party. As a result, the security of stored value payment instruments is improved because unauthorized parties are unable to activate, redeem, or otherwise access or use stored value payment instruments they do not own.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
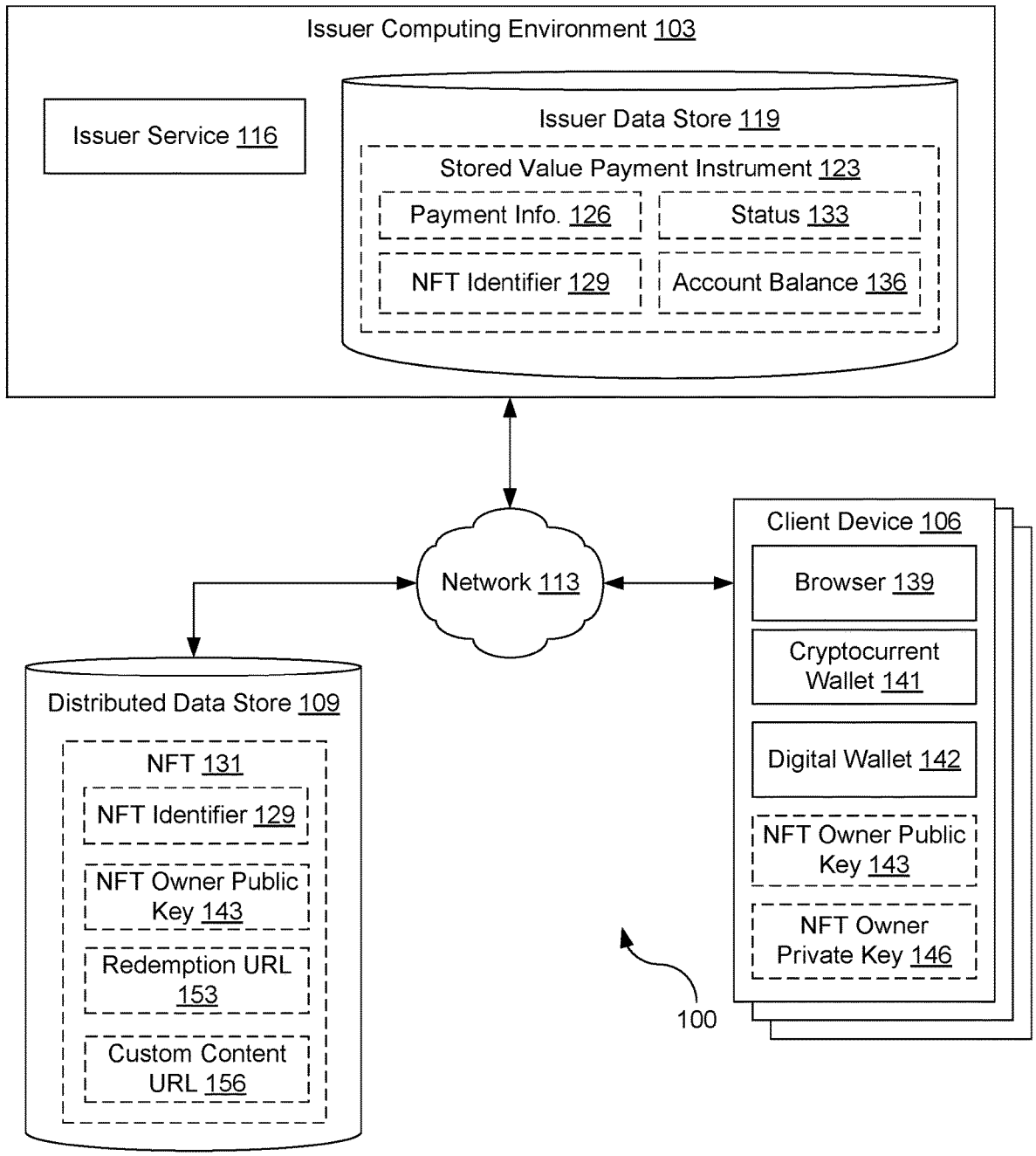
FIG. 1 is a drawing of a network environment according to various embodiments of the present disclosure.

With reference to FIG. 1, shown is a network environment 100 according to various embodiments. The network environment 100 can include an issuer computing environment 103, one or more client devices 106, and a distributed data store 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The issuer computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the issuer computing environment 103 can employ a plurality of computing devices that can be arranged in one or more server banks or computer banks or other arrangements. Such computing devices can be located in a single installation or can be distributed among many different geographical locations. For example, the issuer computing environment 103 can include a plurality of computing devices that together can include a hosted computing resource, a grid computing resource or any other distributed computing arrangement. In some cases, the issuer computing environment 103 can correspond to an elastic computing resource where the allotted capacity of processing, network, storage, or other computing-related resources can vary over time.

Various applications or other functionality can be executed in the issuer computing environment 103. The components executed on the computing issuer environment 103 include an issuer service 116, and potentially other applications.

Also, various data is stored in an issuer data store 119 that is accessible to the issuer computing environment 103. The issuer data store 119 can be representative of a plurality of issuer data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the issuer data store 119 is associated with the operation of the various applications or functional entities described below. This data can include one or more stored value payment instruments 123 and potentially other data.

The stored value payment instrument 123 can represent any payment instrument with a preset or predefined monetary value associated with the payment instrument itself, which the user could use to pay a merchant in exchange for goods or services. This could include a prepaid monetary account where a user purchases the stored value payment instrument 123 with an initial value. In some instances, the stored value payment instrument 123 could be reloadable, where a user could deposit additional funds within the account linked to the stored value payment instrument 123 to increase the amount of funds associated with the payment instrument itself. Examples of stored value payment instruments 123 include open-loop gift cards or payment cards, closed-loop gift cards or payment cards, prepaid debit cards, etc.

Accordingly, a stored value payment instrument 123 could include various data to allow for it to be used as payment instrument or to be transferred between individuals. This data can include payment information 126, an NFT owner public key 129, a status 133 of the stored value payment instrument 123, and an account balance 136. Additional data or information can be stored in association with the stored value payment instrument 123 as desired for various implementations.

The payment information 126 can represent information that would allow the stored value payment instrument 123 to be used in a transaction. For example, if the stored value payment instrument 123 were an open loop gift card, open loop payment card, or prepaid debit card, this could include information such as an account number for use in making payments, an expiration date, a card security code (CSC), a card verification value (CVV), a card validation code (CVC), a card identification number (CID), etc.

The NFT identifier 129 represents the unique identifier for a respective NFT 131, which uniquely identifies the NFT 131 with respect to other NFTs 131. The NFT identifier 129 can be formatted in various ways, depending on which standard the NFT 131 complies with. Examples of NFT standards include the ETHEREUM ERC-721 standard, ETHEREUM ERC-1155 standard, the FLOW blockchain NFT standard, etc. The NFT 131, as further discussed, can be used to determine or transfer ownership of the stored value payment instrument 123 between individuals.

The status 133 can represent the current state of the stored value payment instrument 133, which may be used to determine whether a transaction can be authorized, whether the stored value payment instrument 123 can be transferred, etc. Example values for the status 133 could be "unredeemed," "redeemed," "expired," "revoked," "cancelled," etc.

The account balance 136 can represent the amount of funds currently available to the stored value payment instrument 123. As the stored value payment instrument 123 is used for purchases, the account balance 136 can decrease. Likewise, if the stored value payment instrument 123 is reloaded with additional funds, the account balance 136 can increase.

The issuer service 116 can be executed to perform a variety of functions, as further discussed in this application. For example, the issuer service 116 could be executed to create a stored value payment instrument 123 in response to receipt of funds (e.g., if a gift card or prepaid debit card were being purchased). The issuer service 116 could also be executed to create an NFT 131 that can be used to uniquely identify the stored value payment instrument 123 and associate the NFT 131 with the stored value payment instrument 123. The issuer service 116 can also be executed to verify ownership of the stored value payment instrument 123 using the NFT 131, as well as to facilitate eventual redemption of the stored value payment instrument 123 for use in future transactions.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications, such as a browser 139, a cryptocurrency wallet 141, or a digital wallet 142. The browser 139 could be used to interact with web pages provided by the issuer service 116, such as web pages that allow a user to purchase a stored value payment instrument 123. The cryptocurrency wallet 141 could be executed to allow a user to manage his or her NFT owner public key 143, NFT owner private key 146, and any NFTs 131 that are currently owned by the user. The digital wallet 142 could be used to store transaction account information, such as the payment information 126 of a stored value payment instrument 123, for use in payment transactions with merchants or other users. Examples of a digital wallet 142 include APPLE PAY, GOOGLE PAY, SAMSUNG PAY, etc.

The NFT owner public key 143 represents a public key associated with an owner of the NFT 131. The NFT owner public key 143 can be used to uniquely identify the owner of the NFT 131. The NFT owner public key 143 can also be used to assert or verify ownership of an NFT 131 by its owner.

The NFT owner private key 146 is the respective private key for the NFT owner public key 143. The NFT owner private key 146 allows for the owner of an NFT 131 to verify his or her ownership by generating cryptographically secure signatures that can be verified using the NFT owner public key 143.

The distributed data store 109 represents a synchronized, eventually consistent, data store spread across multiple nodes in different geographic or network locations. Each node in the distributed data store 109 can contain a replicated copy of the distributed data store 109, including all data stored in the distributed data store 109. Records of transactions involving the distributed data store 109 can be shared or replicated using a peer-to-peer network connecting the individual nodes that form the distributed data store 109. Once a transaction or record is recorded in the distributed data store 109, it can be replicated across the peer-to-peer network until the record is eventually recorded with all nodes. Various consensus methods can be used to ensure that data is written reliably to the distributed data store 109. In some implementations, data, once written to the distributed data store 109, is immutable. Examples of a distributed ledger can include various types of blockchains, distributed hash tables (DHTs), and similar data structures. Various data can be stored in the distributed data store 109, such as one or more non-fungible tokens (NFTs) 131.

An NFT 131 represents a non-fungible unit of data stored in the distributed data store 109. Because an NFT 131 is non-fungible, it can be used for a variety of purposes where fungibility is undesirable. For example, an NFT 131 could be used to represent ownership of a non-fungible digital or physical item, such as an individual stored value payment instrument 123. Accordingly, in various implementations of the present disclosure, an NFT 131 can include an NFT identifier 129, an NFT owner public key 143, a redemption uniform resource locator (URL) 153, and/or a custom content URL 156. The NFT identifier 129 and NFT owner public key 143 have been previously defined and discussed.

The redemption URL 153 can represent a URL or other address where an owner of the NFT 131 can redeem the stored value payment 123 identified by the NFT 131. For example, the redemption URL 153 could represent the address for a website provided by the issuer service 116 where a user could activate, access, redeem, or otherwise obtain the payment information 126 for the stored value payment instrument 123.

The custom content URL 156 can represent a URL where user defined or user specified content associated with the NFT 131 or stored value payment instrument 123 can be found. For example, if the stored value payment instrument 123 were purchased as a birthday present, the custom content URL 156 could represent a location where the recipient could find a song, photo, video, note, or other media could for consumption.

Referring next to FIG. 2A, shown is a sequence diagram that provides one example of the operation of portions of the network environment 100. The sequence diagram of FIG. 2A provides merely an example of the many different types of functional arrangements that can be employed to implement the operation of the depicted portions of the network environment 100. As an alternative, the flowchart of FIG. 2A can be viewed as depicting an example of elements of a method implemented within the network environment 100.

Beginning with block 201, a first user can use his or her client device 106a to make a purchase of a stored value payment instrument 123. For example, the first user could use the browser 139 on his or her client device 106a to visit a website provided by the issuer service 116 in order to purchase the stored value payment instrument 123. As part of the purchase process, the user could select an amount for the starting account balance 136 of the stored value payment instrument 123. As part of the purchase process, the user could also use his or her cryptocurrency wallet 141 on his or her client device 106a to provide the issuer service 116 with his or her NFT owner public key 143.

In some implementations, the first user could also provide custom or personalized content to the issuer service 116 during the purchase. For example, the first user could provide a custom content URL 156 that points to content or media (e.g., a video, an audio file, a picture, a webpage, etc.), which could be included in the NFT 131. This could be done by the first user in order to personalize a gift (e.g., by submitting a custom content URL 156 to a recording of family members singing the song "Happy Birthday").

Alternatively, in some implementations, the first user could select or purchase custom content to include in the NFT 131 during the purchase process. For example, the issuer service 116 could provide the first user with the option to purchase a digital recording of a celebrity singing "Happy Birthday." As another example, the issuer service 116 could offer for purchase limited edition or collectible digital artwork, which the first user could purchase to have associated with the stored value payment instrument 123.

In response to the purchase, the issuer service 116 can create or issue the stored value payment instrument 123 at block 203. For example, the issuer service 116 could generate payment information 126 and save it as part of the record for new stored value payment instrument 123. The issuer service 123 could also set the account balance 136 to the value specified by the first user at block 201. Finally, the issuer service 123 could set the status 133 to an appropriate value (e.g., "not activated," "unredeemed," etc.).

Additionally, the issuer service 116 can, at block 206, create an NFT 131. The issuer service 116 could create the NFT 131 using various approaches. For example, the distributed data store 109 could provide a function, interface, or other mechanism that the issuer service 116 could use to create the NFT 131. In some of these implementations, the issuer service 116 could provide the redemption URL 153 and/or custom content URL 156 as arguments or parameters for the function provided by the distributed data store 109. In other implementations, the issuer service 116 could update the NFT 131 after the NFT 131 is created to include the redemption URL 153 and/or custom content URL 156.

Moving to block 209, the issuer service 116 can link the NFT 131 created at block 206 to the stored value payment instrument 123 purchased at block 201 and created at block 203. For example, the issuer service 116 could store the NFT identifier 129 of the NFT 131 created at block 206 as the NFT identifier 129 for the stored value payment instrument 123. As a result, the issuer service 116 can track ownership of stored value payment instrument 123 based at least in part on the link between the NFT 131 and the stored value payment instrument 123.

Next, at block 211, the issuer service 116 can assign or transfer ownership of the NFT 131 to the first user. This can be done by updating the NFT owner public key 143 of the NFT 131 to match the NFT owner public key 143 of the first user. For example, as part of the purchase process at block 201, the first user may have used his or her cryptocurrency wallet 141 on his or her client device 106a to provide the issuer service 116 with his or her NFT owner public key 143. The issuer service 116 could therefore update the NFT 131 to include the NFT owner public key 143 received at block 201 as part of the purchase process to assign ownership of the NFT 131 to the first user.

Subsequently, at block 213, the first user can transfer ownership of the NFT 131 to a second user. For example, the first user could use the cryptocurrency wallet 141 on his or her client device 106a to update the NFT 131 to replace his or her NFT owner public key 143 with the NFT owner public key 143 of the second user. If the first user does not know or have the NFT owner public key 143 of the second user, the cryptocurrency wallet 141 could be executed or configured to query the distributed data store 109, a key service, or an identity service or provider to obtain the NFT owner public key 143 of the second user.

At block 216, the second user can be notified of the transfer of the NFT 131. Although depicted as occurring after the transfer, the notification could occur prior to the transfer at block 213 or concurrently with the transfer of ownership at block 213. The notification could be provided through a variety of mechanisms as well. In some implementations, the cryptocurrency wallet 141 executing on the client device 106b of the second user could detect the change in ownership of the NFT 131 and alert the second user that he or she is the new owner of the NFT 131. In other implementations, the first user could notify the second user directly using an out of band communication (e.g., by emailing, calling, or otherwise informing the second user of the transfer). Other approaches for notifying the second user are also encompassed by the various embodiments of the present disclosure.

Then, at block 223, the second user could redeem the stored value payment instrument 123 linked to the NFT 131. For example, the second user could use his or her cryptocurrency wallet 141 executing on his or her client device 106b to view the NFT 131 and obtain the redemption URL 153. The second user could then use the browser on his or her client device 106b to visit a redemption website offered by the issuer service 116 that is located at the redemption URL 153. To redeem the stored value payment instrument 123, the second user could provide the NFT identifier 129 of the NFT 131 associated with stored value payment instrument 123.

While visiting the redemption website, the second user could prove his or her identity as the owner of the NFT 131. For example, the second user could use his or her cryptocurrency wallet 141 to sign a challenge provided by the redemption website with his or her NFT owner private key 146. The redemption website maintained by the issuer service 116 could then use the NFT owner public key 143 stored in the NFT 131 to validate the signature, thereby proving the second user is the current owner of the NFT 131 associated with the stored value payment instrument 123.

In response to the second user redeeming the stored value payment instrument 123 at block 223, the issuer service 116 can mark or otherwise render the NFT 131 non-transferrable. This could include deactivating or destroying the NFT 131. For example, if the NFT 131 were stored on the ETHEREUM blockchain network, the NFT owner public key 143 could be set equal to the value of the ETHEREUM dead address, making the NFT 131 non-transferrable. For other blockchain networks that provide for a burned token address, the issuer service 116 could set the value of the NFT owner public key 143 of the NFT 131 equal to the burned token address. This can be done for fraud and security purposes to protect the second user in the event that the NFT 131 were to be stolen.

Proceeding to block 229, the issuer service 116 can provide the payment information 126 to the second user. For example, the issuer service 116 could search for a stored value payment instrument 123 with an NFT identifier 129 that matches the NFT identifier 129 of the NFT 131 submitted by the second user at block 223. The issuer service 116 could then encode the payment information 126 of the stored value payment instrument 123 in a web page that is sent to the browser 139 executing on the client device 106b of the second user. This would cause the browser 139 to display the payment information 126 to the second user. Once displayed, the second user could save the payment information (e.g., to the digital wallet 142) for use in future transactions.

Figure 3:
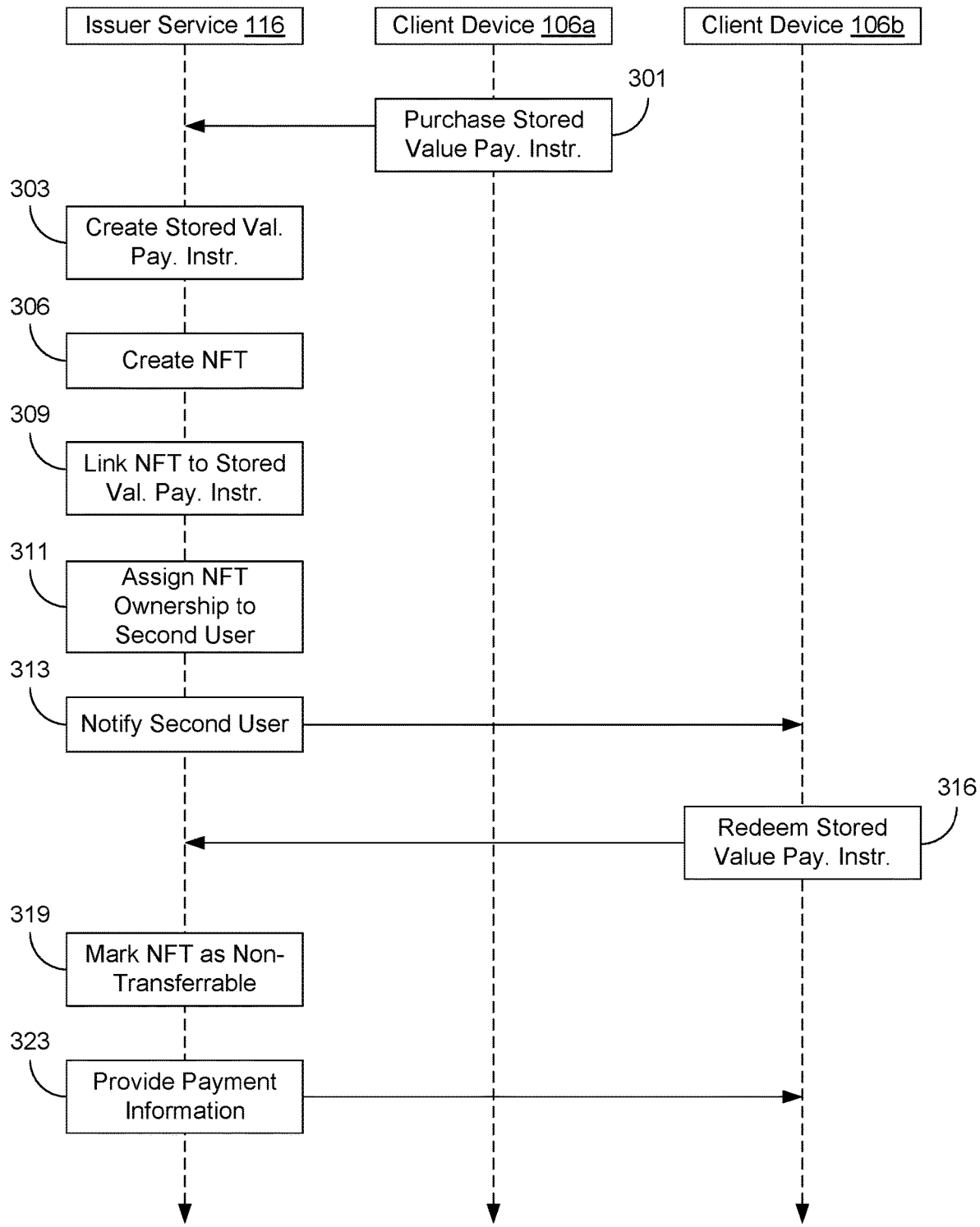
FIG. 3 is a sequence diagram illustrating a second example of the purchase and transfer of ownership of a stored value payment instrument in the network environment of FIG. 1 according to various embodiments of the present disclosure.

Referring next to FIG. 3, shown is a sequence diagram that provides one example of the operation of portions of the network environment 100. The sequence diagram of FIG. 3 provides merely an example of the many different types of functional arrangements that can be employed to implement the operation of the depicted portions of the network environment 100. As an alternative, the flowchart of FIG. 3 can be viewed as depicting an example of elements of a method implemented within the network environment 100.

Figure 2:
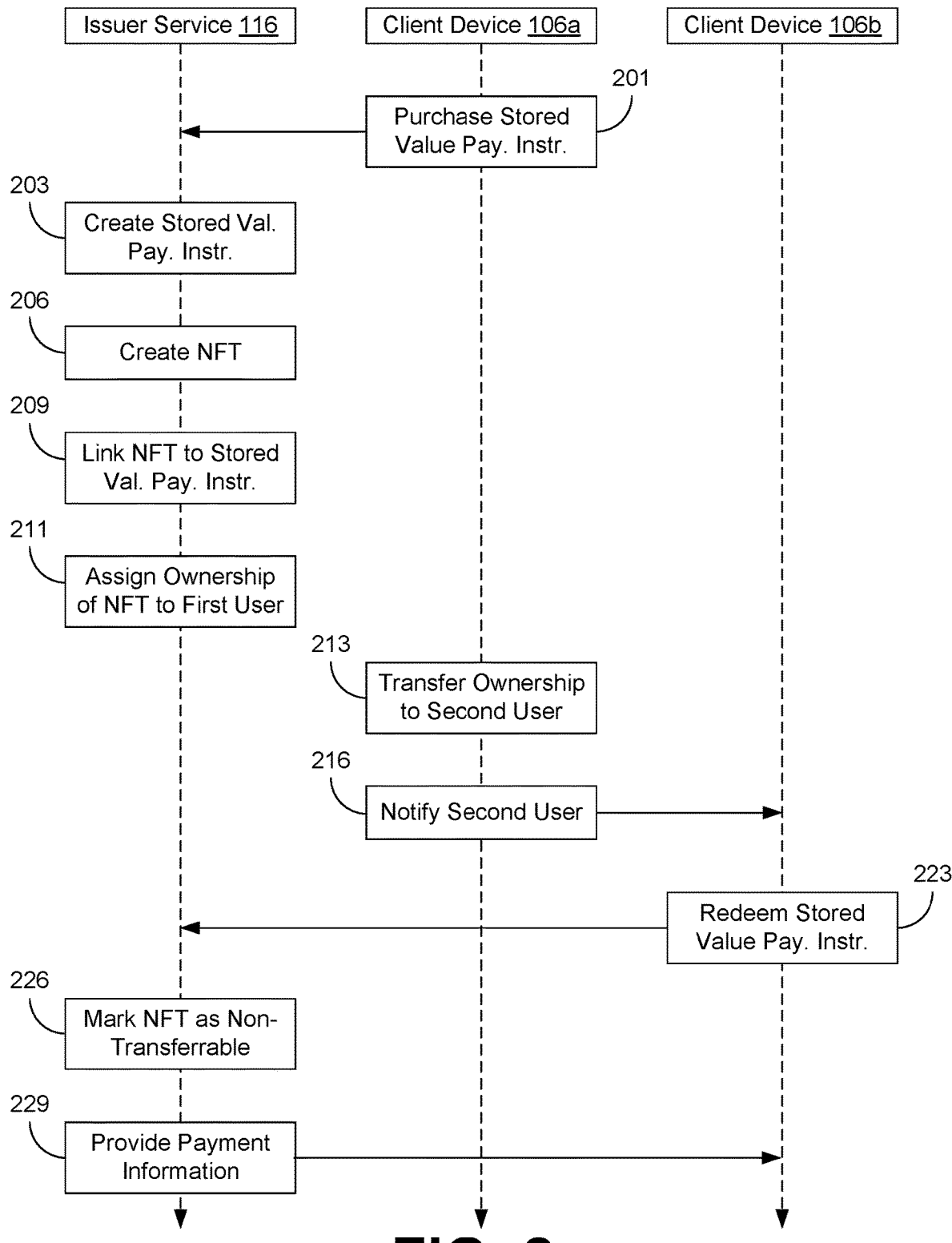
FIG. 2 is a sequence diagram illustrating one example of the purchase and transfer of ownership of a stored value payment instrument in the network environment of FIG. 1 according to various embodiments of the present disclosure.

In particular, the sequence diagram of FIG. 3 illustrates an alternative approach to that depicted in FIG. 2 for a first user to purchase a stored value payment instrument 123 for the benefit of a second user. For example, the first user could use the process depicted in the sequence diagram of FIG. 3 to purchase a gift card as a gift for a friend, relative, or acquaintance. Accordingly, while the process of FIG. 3 is different from the process depicted in FIG. 2, a number of the steps are performed in the same or a similar manner as those steps described in FIG. 2.

Beginning with block 301, a first user can use his or her client device 106a to make a purchase of a stored value payment instrument 123. For example, the first user could use the browser 139 on his or her client device 106a to visit a website provided by the issuer service 116 in order to purchase the stored value payment instrument 123. As part of the purchase process, the user could select an amount for the starting account balance 136 of the stored value payment instrument 123. As part of the purchase process, the user could also provide the NFT owner public key 143 of the second user as the intended recipient of the stored value payment instrument 123.

In some implementations, the first user could also provide custom or personalized content to the issuer service 116 during the purchase. For example, the first user could provide a custom content URL 156 that points to content or media (e.g., a video, an audio file, a picture, a webpage, etc.), which could be included in the NFT 131. This could be done by the first user in order to personalize a gift (e.g., by submitting a custom content URL 156 to a recording of family members singing the song "Happy Birthday").

Alternatively, in some implementations, the first user could select or purchase custom content to include in the NFT 131 during the purchase process. For example, the issuer service 116 could provide the first user with the option to purchase a digital recording of a celebrity singing "Happy Birthday." As another example, the issuer service 116 could offer for purchase limited edition or collectible digital artwork, which the first user could purchase to have associated with the stored value payment instrument 123.

In response to the purchase, the issuer service 116 can create or issue the stored value payment instrument 123 at block 303. For example, the issuer service 116 could generate payment information 126 and save it as part of the record for new stored value payment instrument 123. The issuer service 123 could also set the account balance 136 to the value specified by the first user at block 301. Finally, the issuer service 123 could set the status 133 to an appropriate value (e.g., "not activated," "unredeemed," etc.).

Additionally, the issuer service 116 can, at block 306, create an NFT 131. The issuer service 116 could create the NFT 131 using various approaches. For example, the distributed data store 109 could provide a function, interface, or other mechanism that the issuer service 116 could use to create the NFT 131. In some of these implementations, the issuer service 116 could provide the redemption URL 153 and/or custom content URL 156 as arguments or parameters for the function provided by the distributed data store 109. In other implementations, the issuer service 116 could update the NFT 131 after the NFT 131 is created to include the redemption URL 153 and/or custom content URL 156.

Moving to block 309, the issuer service 116 can link the NFT 131 created at block 306 to the stored value payment instrument 123 purchased at block 301 and created at block 303. For example, the issuer service 116 could store the NFT identifier 129 of the NFT 131 created at block 306 as the NFT identifier 129 for the stored value payment instrument 123. As a result, the issuer service 116 can track ownership of stored value payment instrument 123 based at least in part on the link between the NFT 131 and the stored value payment instrument 123.

Next, at block 311, the issuer service 116 can assign or transfer ownership of the NFT 131 to the second user. This can be done be updating the NFT owner public key 143 of the NFT 131 to match the NFT owner public key 143 of the second user. As previously discussed, the NFT owner public key 143 of the second user could have been previously provided by the client device 106a of the first user at block 301.

At block 313, the second user can be notified of the creation of the NFT 131 associated with the stored value payment instrument 123. Although depicted as occurring after the assignment at block 311, the notification could occur prior to the assignment at block 311 or concurrently with the assignment at block 311. The notification could be provided through a variety of mechanisms as well. In some implementations, the cryptocurrency wallet 141 executing on the client device 106b of the second user could detect the change in ownership of the NFT 131 and alert the second user that he or she is the new owner of the NFT 131. In other implementations, the first user could notify the second user directly using an out of band communication (e.g., by emailing, calling, or otherwise informing the second user of the transfer). If the first user had provided contact information for the second user at block 301 (e.g., an email address or a mobile phone number), then the issuer service 116 could notify the second user directly (e.g., by sending an email or a short message service (SMS) message to the second user). A message from the issuer service 116 could additionally include information such as the NFT identifier 129 and/or the redemption URL 153 to facilitate redemption of the stored value payment instrument 123. Other approaches for notifying the second user are also encompassed by the various embodiments of the present disclosure.

Then, at block 316, the second user could redeem the stored value payment instrument 123 linked to the NFT 131. For example, the second user could use his or her cryptocurrency wallet 141 executing on his or her client device 106b to view the NFT 131 and obtain the redemption URL 153. The second user could then use the browser on his or her client device 106b to visit a redemption website offered by the issuer service 116 that is located at the redemption URL 153. Likewise, if the issuer service 116 sent a notification to the second user containing the redemption URL 153, the second user could use the browser 139 on his or her client device 106b to directly access the redemption website. To redeem the stored value payment instrument 123, the second user could provide the NFT identifier 129 of the NFT 131 associated with stored value payment instrument 123.

While visiting the redemption website, the second user could prove his or her identity as the owner of the NFT 131. For example, the second user could use his or her cryptocurrency wallet 141 to sign a challenge provided by the redemption website with his or her NFT owner private key 146. The redemption website maintained by the issuer service 116 could then use the NFT owner public key 143 stored in the NFT 131 to validate the signature, thereby proving the second user is the current owner of the NFT 131 associated with the stored value payment instrument 123.

In response to the second user redeeming the stored value payment instrument 123 at block 319, the issuer service 116 can mark or otherwise render the NFT 131 non-transferrable. This could include deactivating or destroying the NFT 131. For example, if the NFT 131 were stored on the ETHEREUM blockchain network, the NFT owner public key 143 could be set equal to the value of the ETHEREUM dead address, making the NFT 131 non-transferrable. For other blockchain networks that provide for a burned token address, the issuer service 116 could set the value of the NFT owner public key 143 of the NFT 131 equal to the burned token address. This can be done for fraud and security purposes to protect the second user in the event that the NFT 131 were to be stolen.

Proceeding to block 323, the issuer service 116 can provide the payment information 126 to the second user. For example, the issuer service 116 could search for a stored value payment instrument 123 with an NFT identifier 129 that matches the NFT identifier 129 of the NFT 131 submitted by the second user at block 316. The issuer service 116 could then encode the payment information 126 of the stored value payment instrument 123 in a web page that is sent to the browser 139 executing on the client device 106b of the second user. This would cause the browser 139 to display the payment information 126 to the second user. Once displayed, the second user could save the payment information (e.g., to the digital wallet 142) for use in future transactions.

Figure 4:
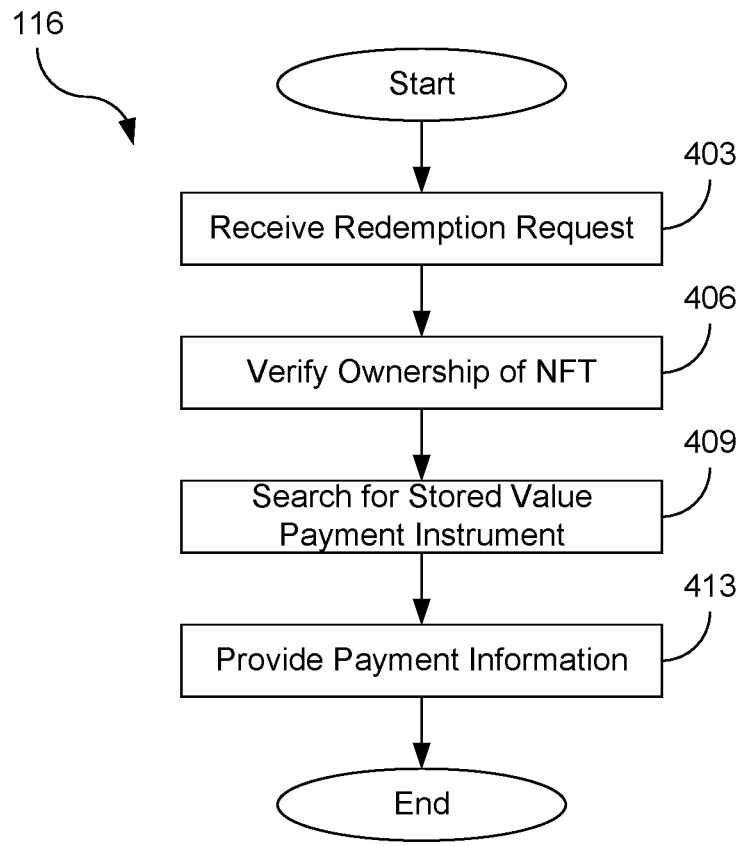
FIG. 4 is a flowchart illustrating one example of the issuer service for redeeming the stored value payment instrument using an NFT in the network environment of FIG. 1 according to various embodiments of the present disclosure.

Referring next to FIG. 4, shown is a flowchart that provides one example of the operation of a portion of the issuer service 116 for redeeming the stored value payment instrument 123 using an NFT 131. The flowchart of FIG. 4 provides merely an example of the many different types of functional arrangements that can be employed to implement the operation of the depicted portion of the issuer service 116. As an alternative, the flowchart of FIG. 4 can be viewed as depicting an example of elements of a method implemented within the network environment 100.

Beginning with block 403, the issuer service 116 can receive a redemption request submitted from a client device 106 using the redemption URL 153 specified in an NFT 131. For example, the user of the client device 106 may have used a browser 139 to access the website located at the redemption URL 153 to access, activate, or otherwise redeem the stored value payment instrument 123 associated with the NFT 131. As part of the redemption request, the user could include the NFT identifier 129 of an NFT 131 associated with the stored value payment instrument 123 and/or the NFT owner public key 143.

Next, at block 406 the issuer service 116 can verify that the user who submitted the redemption request is the owner of the NFT 131 based at least in part on the NFT owner public key 143. This process is further described in the flowchart of FIG. 6

Moving on to block 409, the issuer service 116 can search for the stored value payment instrument 123 in response to verifying that the user who submitted the redemption request is the owner of the NFT 131. For example, the issuer service 116 could search for a stored value payment instrument 123 with an NFT identifier 129 that matches the NFT identifier 129 provided at block 403.

Subsequently at block 413, can provide the payment information 126 of the stored value payment instrument 123 to the client device 106 that made the redemption request at block 403. For example, the issuer service 116 could encode the payment information 126 of the stored value payment instrument 123 in a web page that is sent to the browser 139 executing on the client device 106 of the user.

Figure 5:
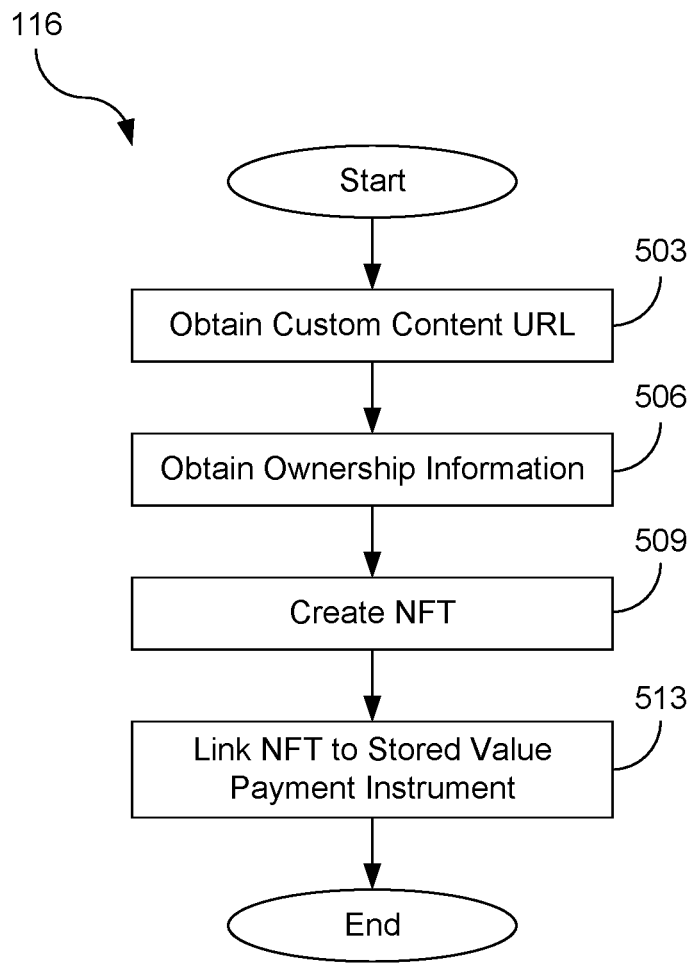
FIG. 5 is a flowchart illustrating one example of functionality of the issuer service for creating NFTs and linking NFTs to stored value payment instruments in the network environment of FIG. 1 according to various embodiments of the present disclosure.

Referring next to FIG. 5, shown is a flowchart that provides one example of the operation of a portion of the issuer service 116 to create an NFT 131 and link it with a stored value payment instrument 123. The flowchart of FIG. 5 provides merely an example of the many different types of functional arrangements that can be employed to implement the operation of the depicted portion of the issuer service 116. As an alternative, the flowchart of FIG. 5 can be viewed as depicting an example of elements of a method implemented within the network environment 100.

Beginning with block 503, the issuer service 116 can obtain a custom content URL 156. In some implementations, the custom content URL 156 could be provided by a user of a client device 106 when he or she purchases stored value payment instrument 123, as previously described in FIG. 2 and FIG. 3. In other implementations, the custom content URL 156 could be provided by third-party service in response to a purchase of custom content to associate with the NFT 131 and stored value payment instrument 123. Moreover, the custom content URL 156 could be generated by the issuer service 116 itself, such as when the user purchasing the stored value payment instrument 116 also purchases or selects custom content offered as an option by the issuer through the issuer service 116 as part of the process of purchasing a stored value payment instrument 123.

Then, at block 506, the issuer service 116 can obtain the ownership information reflecting the initial owner of the stored value payment instrument 123. As previously discussed in FIG. 2 and FIG. 3, this could be either the information of the purchase of the stored value payment instrument 123 or a recipient of the stored value payment instrument 123. This ownership information could include, for example, the NFT owner public key 143 of the owner of the stored value payment instrument 123.

Next, at block 509, the issuer service 116 can create an NFT 131. Once created, the issuer service 116 can update the NFT 131 to include the NFT owner public key 143 obtained at block 506 and the custom content URL 156 obtained at block 503. The issuer service 116 can also insert a redemption URL 153 that would allow a user to redeem or otherwise access the payment information 126 of the stored value payment instrument 123.

Moving on to block 513, the issuer service 116 can link the NFT 131 created at block 509 to the stored value payment instrument 123 that was purchased. For example, the issuer service 116 could store the NFT identifier 129 of the NFT 131 in the record for the stored value payment instrument 123. This would allow the issuer service 116 to search for and identify the stored value payment instrument 123 in response to being presented with the NFT 131 at a later time.

Figure 6:
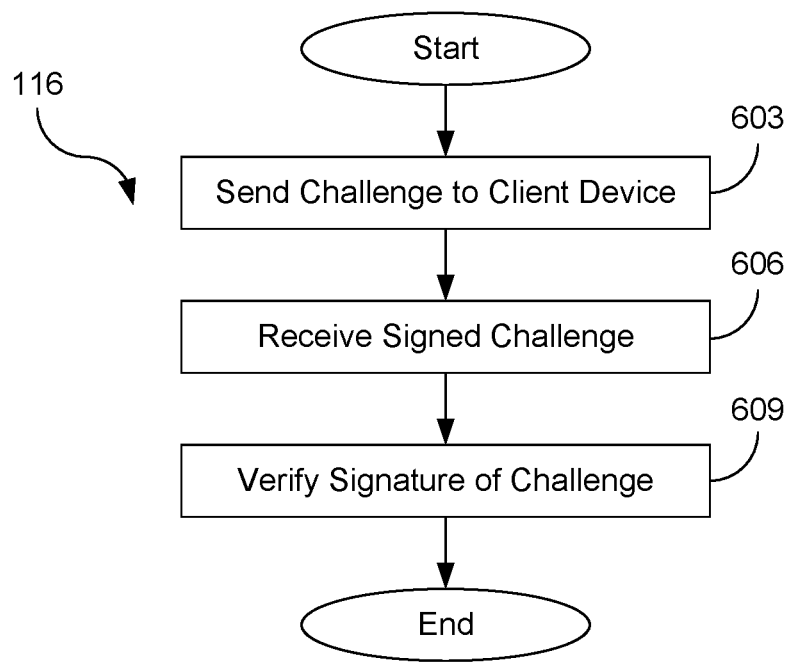
FIG. 6 is a flowchart illustrating one example of functionality of the issuer service for verifying ownership of an NFT in the network environment of FIG. 1 according to various embodiments of the present disclosure.

Referring next to FIG. 6, shown is a flowchart that provides one example of the operation of a portion of the issuer service 116 for verifying ownership of an NFT 131 and, therefore, verifying ownership of the stored value payment instrument 123 linked to the NFT 131. The flowchart of FIG. 6 provides merely an example of the many different types of functional arrangements that can be employed to implement the operation of the depicted portion of the issuer service 116. As an alternative, the flowchart of FIG. 6 can be viewed as depicting an example of elements of a method implemented within the network environment 100.

Beginning with block 603, the issuer service 116 can send a challenge to the client device 106 of a user. The challenge can be any arbitrary piece of data, such as a randomly generated token (e.g., a randomly generated 32-bit, 64-bit, or 128-bit value, etc.,). The randomly generated token could be used in order to both avoid disclosing any financial or payment information related to stored value payment instrument 123 and to prevent replay attacks that attempt to fraudulently reuse signed tokens.

In response at block 606, the issuer service 116 can receive from the client device 106 a signed version of the challenge. For example, the client device 106, in response to receiving the challenge, could have signed the challenge with the NFT owner private key 146 of the respective NFT owner public key 143 associated with the NFT 131. The signed challenge could then have been provided by the client device 106 to the issuer service 116 in return.

Then, at block 609, the issuer service 116 can use the NFT owner public key 143 to verify or validate the signature of the challenge received at block 606. If the issuer service 116 determines that the signature was generated by the NFT owner private key 146, then the issuer service 116 can conclude that the owner or user of the client device 106 is the owner of the NFT 131. As a result, the issuer service 116 could also conclude that the owner or user of the client device 106 is the owner or authorized user of the stored value payment instrument 123.

Figure 7:
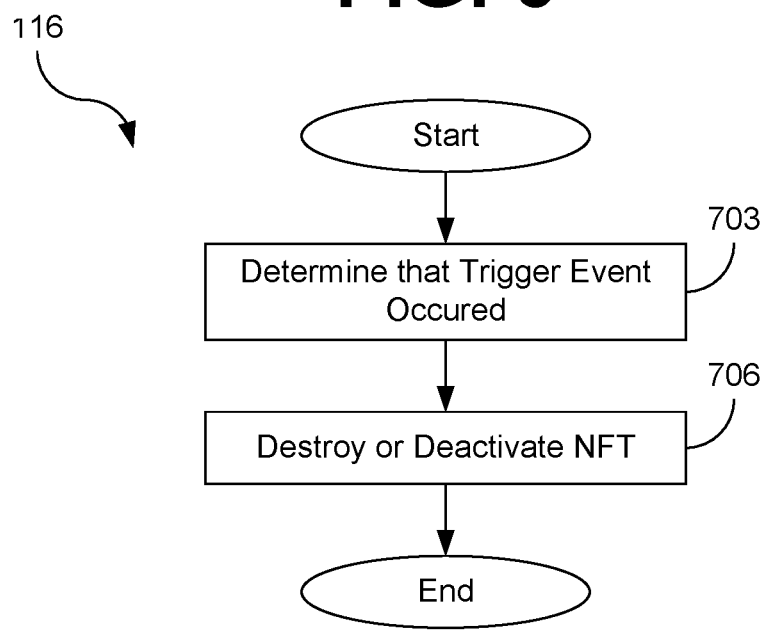
FIG. 7 is a flowchart illustrating one example of functionality of the issuer service for deactivating, destroying, or otherwise rendering NFTs non-transferable in the network environment of FIG. 1 according to various embodiments of the present disclosure.

Referring next to FIG. 7, shown is a flowchart that provides one example of the operation of a portion of the issuer service 116 for deactivating, destroying, or otherwise rendering NFTs 131 non-transferrable. The flowchart of FIG. 7 provides merely an example of the many different types of functional arrangements that can be employed to implement the operation of the depicted portion of the issuer service 116. As an alternative, the flowchart of FIG. 7 can be viewed as depicting an example of elements of a method implemented within the network environment 100.

Beginning with block 703, the issuer system 116 can determine whether a triggering event that would necessitate destruction or deactivation of the NFT 131, or otherwise rendering the NFT 131 non-transferrable has occurred. For example, the issuer system 116 could determine that the stored value payment instrument 123 associated with the NFT 131 has been redeemed by a user. As another example, the issuer system 116 could determine that the stored value payment instrument 123 has expired. In response, the issuer system 116 could determine that the stored value payment instrument 123 can no longer be used or can no longer be transferred.

In response, at block 706, the issuer system 116 can destroy, deactivate, or otherwise render the NFT 131 non-transferrable. This can be done using variety of mechanisms. In some implementations, the NFT 131 could be hosted on a blockchain network that provides a burned token address, such as the ETHEREUM blockchain network. Any tokens that are identified as being owned by the burned token address are considered destroyed and cannot be further transferred. In other implementations, the NFT 131 could provide for an irreversible bit that represents whether the NFT 131 is permitted to be transferred. Once the irreversible bit is set to indicate that the NFT 131 is no longer transferrable, any further attempts to transfer the NFT 131 to other users of the distributed data store 109 would fail. The irreversible bit in these implementations is considered to be irreversible because once the value of the bit is changed to indicate that the NFT 131 is no longer transferrable, the value of the bit cannot be changed back.

In addition to rendering the NFT 131 non-transferrable, the issuer system 116 could additionally or alternatively sever the association between the NFT 131 and the stored value payment instrument 123. For example, the issuer system 116 could remove the NFT identifier 129 from the record of the stored value payment instrument 123 stored in the issuer data store 119. As a result, even if the NFT 131 were subsequently transferred to another party, the issuer service 116 would not recognize the NFT 131 as indicating ownership or control of the stored value payment instrument 123.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
  a computing device comprising a processor and a memory; and
  machine-readable instructions stored in the memory that, when executed by the processor, cause the computing device to at least:
    receive a purchase notification, the purchase notification indicating that a first user has purchased a stored value payment instrument;
    in response to receipt of the purchase notification, create a non-fungible token (NFT) on a distributed data store by providing a redemption uniform resource locator (URL) to a function associated with the distributed data store, the function being configured to generate the NFT to include the redemption URL, the NFT having a unique identifier, and the redemption URL identifying a website for redeeming the stored value payment instrument;
    associate the unique identifier of the NFT with the stored value payment instrument;
    receive a first public key associated with the first user;
    update an owner identifier of the NFT with the first public key associated with the first user;
    transfer an ownership of the NFT associated with the stored value payment instrument to a second user by updating the owner identifier of the NFT with a second public key associated with the second user based at least in part on a request from a first client device of the first user;
    receive the unique identifier of the NFT from a second client device of the second user for redeeming the stored value payment instrument, the unique identifier being received by the website associated with the redemption URL;
    render the NFT non-transferable based at least in part on the second client device of the second user redeeming the stored value payment instrument; and
    encode payment information of the stored value payment instrument in a web page that is provided to the second client device after rendering the NFT non-transferrable.

2. The system of claim 1, wherein the machine-readable instructions further cause the computing device to at least:
  identify the second client device of the second user accessing the website associated with the redemption URL;
  receive a redemption request through the website identified by the redemption URL from the second user, the redemption request comprising a signature generated by the second client device; and
  validate that the second user is authorized to redeem the stored value payment instrument associated with the NFT, validating the second user comprising validating the signature using the second public key.

3. The system of claim 2, wherein rendering the NFT non-transferrable further cause the computing device to update the owner identifier of the NFT to a non-transferrable NFT value.

4. The system of claim 3, wherein the non-transferrable NFT value is at least one of a burned token address or a dead address for a blockchain network of the NFT.

5. The system of claim 3, wherein the machine-readable instructions that cause the computing device to render the NFT non-transferrable further cause the computing device to at least remove the association between the unique identifier of the NFT and the stored value payment instrument.

6. The system of claim 1, wherein the machine-readable instructions further cause the computing device to at least:
  receive a custom content uniform resource locator (URL) from the first user, the custom content URL representing an address where user selected content is located; and
  add the custom content URL to the NFT.

7. The system of claim 1, wherein transferring the ownership of the NFT associated with the stored value payment instrument further cause the computing device to at least:

receive the second public key from a cryptocurrency wallet of the first user, the second public key being associated with a second user; and transmit a notification of the transfer of the NFT to the second client device based at least in part on the update of the owner identifier of the NFT with the second public key associated with the second user.

8. A method, comprising:

receiving a purchase notification, the purchase notification indicating that a first user has purchased a stored value payment instrument;

in response to receiving the purchase notification, creating a non-fungible token (NFT) on a distributed data store by providing a redemption uniform resource locator (URL) to a function associated with the distributed data store, the function being configured to generate the NFT to include the redemption URL, the NFT having a unique identifier, and the redemption URL identifying a website for redeeming the stored value payment instrument;

associating the unique identifier of the NFT with the stored value payment instrument;

receiving a first public key associated with the first user;

updating an owner identifier of the NFT with the first public key associated with the first user;

transferring the NFT to a second user by updating the owner identifier of the NFT with a second public key associated with the second user based at least in part on a request from a first client device of the first user;

receiving the unique identifier of the NFT from a second client device of the second user for redeeming the stored value payment instrument;

rendering the NFT non-transferable based at least in part on receiving the unique identifier from the second client device for redeeming the stored value payment; and encoding payment information of the stored value payment instrument in a web page that is provided to the second client device after rendering the NFT non-transferable.

9. The method of claim 8, further comprising:

identifying the second client device of the second user accessing the website associated with the redemption URL;

receiving a redemption request through the website identified by the redemption URL from a second user; and validating that the second user is authorized to redeem the stored value payment instrument associated with the NFT.

10. The method of claim 9, wherein rendering the NFT non-transferable further comprises updating the owner identifier of the NFT to a non-transferrable NFT value.

11. The method of claim 10, wherein the non-transferrable NFT value is at least one of a burned token address or a dead address for a blockchain network of the NFT.

12. The method of claim 10, wherein rendering the NFT non-transferable further comprises removing the association between the unique identifier of the NFT and the stored value payment instrument.

13. The method of claim 8, further comprising receiving a custom content uniform resource locator (URL) from the first user, the custom content URL representing an address where user selected content is located; and adding the custom content URL to the NFT.

14. The method of claim 8, wherein transferring the stored value payment instrument further comprises:

receiving the second public key from a cryptocurrency wallet of the first user, the second public key being associated with a second user; and transmitting a notification of the transfer of the NFT to the second client device based at least in part on updating the owner identifier of the NFT with the second public key associated with the second user.

15. A non-transitory, computer-readable medium, comprising machine-readable instructions that, when executed by a processor of a computing device, cause the computing device to at least:

receive a purchase notification, the purchase notification indicating that a first user has purchased a stored value payment instrument;

in response to receipt of the purchase notification, create a non-fungible token (NFT) on a distributed data store by providing a redemption uniform resource locator (URL) to a function associated with the distributed data store, the function being configured to generate the NFT to include the redemption URL, and the redemption URL identifies a website for redeeming the stored value payment instrument;

associate a unique identifier of the NFT with the stored value payment instrument;

receive a first public key associated with the first user;

update an owner identifier of the NFT with the first public key associated with the first user;

transfer the NFT to a second user by updating the owner identifier of the NFT with a second public key associated with the second user based at least in part on a request from a first client device of the first user;

render the NFT non-transferable based at least in part on a second client device of the second user accessing the website associated with the redemption URL; and encode payment information of the stored value payment instrument in a web page that is provided to the second client device after rendering the NFT non-transferable.

16. The non-transitory, computer-readable medium of claim 15, wherein the machine-readable instructions further cause the computing device to at least:

identify the second client device of the second user accessing the website associated with the redemption URL;

receive a redemption request through the website identified by the redemption URL from a second user; and validate that the second user is authorized to redeem the stored value payment instrument associated with the NFT.

17. The non-transitory, computer-readable medium of claim 16, wherein rendering the NFT non-transferable further cause the computing device to update the owner of the identifier of the NFT to a non-transferrable NFT value.

18. The non-transitory, computer-readable medium of claim 17, wherein the non-transferrable NFT value a burned token address or a dead address for a blockchain network of the NFT.

19. The non-transitory, computer-readable medium of claim 17, wherein the machine-readable instructions that cause the computing device to render the NFT non-transferable further cause the computing device to at least remove the association between the unique identifier of the NFT and the stored value payment instrument.

* * * * *